Figure 1:
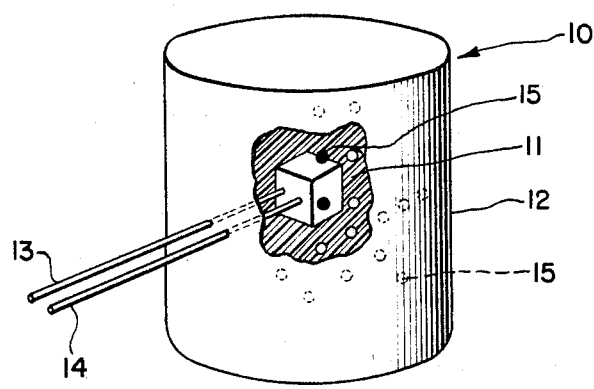

Aug. 6, 1968   L. U. RASTRELLI ET AL   3,395,564
ELASTOMERIC STRAIN MODULE AND METHOD OF CALIBRATION THEREOF
Filed May 25, 1964

INVENTORS
Leonard U. Rastrelli
Eugene L. Anderson
By Richard J. Miller
Atty.

United States Patent Office 3,395,564
Patented Aug. 6, 1968

3,395,564
ELASTOMERIC STRAIN MODULE AND METHOD OF CALIBRATION THEREOF
Leonard U. Rastrelli and Eugene L. Anderson, San Antonio, Tex., assignors, by mesne assignments, to the United States of America as represented by the Secretary of the Navy
Filed May 25, 1964, Ser. No. 370,138
6 Claims. (Cl. 73—1)

This invention relates to elastomeric strain gauges and more particularly to an elastomeric strain measuring module.

Embedment of any signal generating, strain measuring device in an elastomeric or viscoelastic material such as the fuel grains used in solid rocket propellants, gives rise to distortions in the measurements of strain therein resulting from the very presence of the device itself. By prepackaging the strain measuring device in a small elastomeric module the device-module combination can then be calibrated with relative facility to account for these distortions.

An object therefore of the present invention is to provide a new and improved elastomeric strain gauge.

Another object of the present invention is to provide a fully calibrated strain gauge capable of facilitated handling and embedment in elastomeric material.

Still another object of the present invention is to provide a fully calibrated elastomeric strain measuring module.

A further object is to provide a fully calibrated strain measuring module for embedment in an elastomeric body and comprising a signal generating strain gauge capsulated in elastomeric material having physical properties substantially equivalent to the material of the body in which the module is to be embedded, means connecting said gauge to a signal measuring system and a plurality of spaced particles embedded in said capsule whereby the module may be calibrated prior to embedment in the body to account for distortions of the strain measurements caused by introduction of the strain gauge itself into the material.

Yet another object of the present invention is to provide a method for fully calibrating an elastomeric strain measuring module adapted for embedment in an elastomeric body.

Still another object of the present invention is to provide a method of fully calibrating an elastomeric strain measuring module adapted for connection to a signal measuring system and for embedment in an elastomeric mass, comprising the steps of capsulating a strain measuring gauge in a sheath of material having substantially equivalent physical properties as the elastomeric material in which the module will be embedded, discerning the displacements within the elastomeric material of the sheath which are induced by the presence of the gauge and then calibrating the module prior to embedment in the elastomeric body to account for said displacements.

Figure 2:
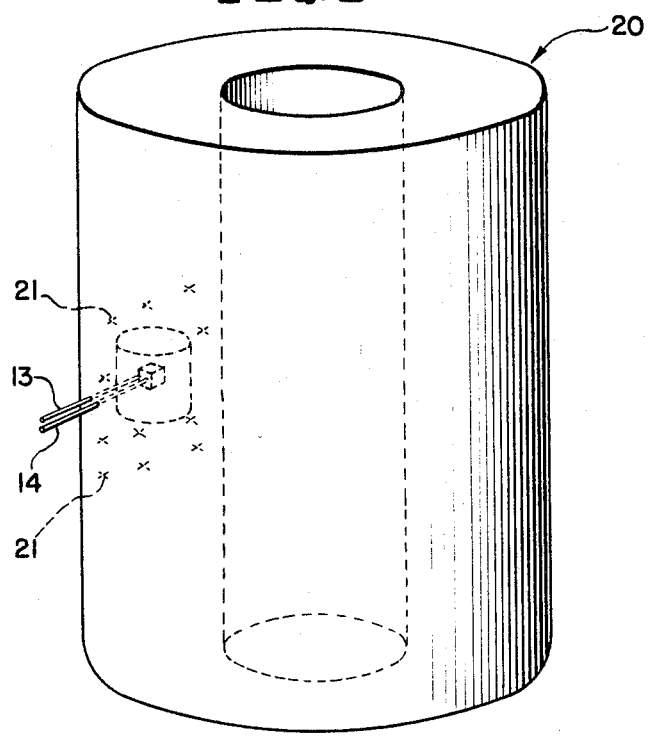

Other objects and advantages of the present invention will be apparent when taken in connection with the following description and drawings which:

FIGURE 1 is an enlarged perspective, partially sectioned view showing a more or less pictorial representation of an embodiment of the invention; and FIGURE 2 is a perspective more or less pictorial view showing an embodiment of the present invention embedded in an elastomeric body.

Referring now to the drawings and more particularly to FIGURE 1 there is shown an elastomeric module, designated generally at 10, and including a strain measuring transducer or gauge 11 encased in an elastomeric capsule or sheath 12 in accordance with the present invention. Lead wires 13 and 14 are connected to gauge 11 and run through capsule 12 for connection to a suitable electrical indicating system (not shown) such as a Wheatstone bridge circuit. Preferably, within capsule 12 there is embedded a plurality of spaced metallic particles 15 which are mutually aligned so that their later displacement, if any, may be determined.

Module 10 may contain several such gauges 11 and may thereby be considered as biaxial or triaxial in its strain measuring capacity. The number of gauges 11 in a module will depend upon the types of strain measurements desired to be accumulated.

FIGURE 2 shows the previously described module 10 embedded in a hollow cylinder or body, designated generally at 20, of elastomeric material. As indicated, the module of the present invention has particular application to viscoelastic fuel grains such as those comprising solid rocket propellants. A second series of mutually aligned and spaced particles 21 may be embedded in elastomeric body 20 as a further comparative means of determining ultimate displacements within body 20.

As indicated previously it is desirable in solid rocket fuels to measure the strain distributions within the solid bodies constituting the fuel. However, such viscoelastic materials ordinarily have such low strength moduli that merely the embedment of a signal generating, strain measuring device causes serious distortions in the acquired strain values. In accordance with the present invention the material of the capsule, it is to be understood, is identical with or has substantially equivalent physical properties to the material in which the module will ultimately be embedded. Thus, such a small module may handily be subjected to proper loads and the results and strain measurements acquired through the electrical indicating system to which the gauge 11 is attached by leads 13 and 14. If the elastomeric material being used is transparent and photosensitive the actual displacement of the particles 15 may be acquired and the results compared with the values given by gauge 11. The gauge may then be calibrated to account for those strains which have been induced by the presence of the gauge itself. Thus, the module 10 is now fully calibrated and highly accurate and may be embedded in a larger elastomeric body or mass with facility to perform its function without the presence of the previously mentioned errors. If the elastomeric material encasing gauge 11 is opaque and not photosensitive the displacement of particles 15 may be determined by the use of an X-ray facility. Of course, once the actual displacement of the particles is acquired the previously mentioned comparisons may be made. As shown in FIGURE 2 additional particles 21 may be embedded in the elastomeric body 20 itself should other auxiliary measurements be desirable.

As a further adjunct to the invention described herein, after embedment of gauge 11 in capsule 12 the establishment of strain patterns in the capsule during the curing period may be quantitatively monitored and photoelastically compared to strain patterns established in the curing period in geometrically identical elastomeric capsules. Any variations in the strain gradients may then be reflected in the ultimate calibration of gauge 11, further adding to the accuracy and efficiency of module 10. In the manner described herein valuable and accurate information relating to strain patterns and gradients and the failure susceptibility of solid rocket propellants may be acquired.

Obviously many modifications and variations of the present invention are possible in the light of the above teachings. It is therefore to be understood that within the scope of the appended claims the invention may be practiced otherwise than as specifically described.

We claim:
1. A fully calibrated, elastomeric strain measuring module for coupling to a signal measuring system and for embedment in an elastomeric body, comprising:
 (a) a signal generating transducer;
 (b) means for connecting said transducer to the signal measuring system;
 (c) a capsule of elastomeric material encasing said transducer;
 (d) said material having physical properties substantially equivalent to those of the elastomeric body including being relatively transparent; and
 (e) a plurality of opaque spaced particles embedded in said capsule, whereby the module may be pre-calibrated to account for distortions in the strain gradients occasioned by introduction of the transducer into the elastomeric body.

2. A fully calibrated, elastomeric strain measuring module for coupling to a signal measuring system and for embedment in an elastomeric body, comprising:
 (a) an electrical resistance strain gauge;
 (b) lead wires connecting said gauge to the signal measuring system;
 (c) a capsule of elastomeric material permanently encasing said gauge;
 (d) said material having physical properties substantially equivalent to those of the elastomeric body including being relatively transparent; and
 (e) a plurality of spaced, mutually aligned metallic particles embedded in said capsule, whereby the module may be fully calibrated prior to embedment in the elastomeric body to account for the strain-gauge-induced distortions in the strain gradients of the body.

3. The method of fully calibrating an elastomeric displacement measuring module adapted for connection to a signal measuring system and for embedment in an elastomeric mass, comprising the steps of:
 (a) capsulating a displacement measuring transducer in elastomeric material having substantially equivalent physical properties as the elastomeric mass;
 (b) discerning the displacements within the elastomeric material of the capsule induced by said transducer; and
 (c) calibrating the module prior to embedment thereof in the elastomeric mass to account for said transducer induced displacement.

4. The method of fully calibrating an elastomeric strain measuring module adapted for connection to a signal measuring system and for embedment in an elastomeric body comprising the steps of:
 (a) capsulating a strain gauge in elastomeric material having spaced particles embedded therein and also having physical properties substantially equivalent to those of the elastomeric body;
 (b) connecting the gauge to the signal measuring system;
 (c) applying a load to the capsulated gauge;
 (d) observing the resultant strains in the elastomeric capsule as defined by the movement of the particles and further observing the apparent strains therein as indicated by the signal measuring system; and
 (e) calibrating the gauge prior to embedment of the module in the elastomeric body to account for those strains in the capsule which are induced by the presence of the gauge.

5. The method of claim 4 including curing the capsule after embedment of the strain gauge and monitoring the establishment of strain patterns in the capsule during the curing period.

6. The method of claim 5 wherein the embedded particles are metallic and mutually aligned, the elastomeric material is substantially opaque, and the movement of the particles defining the strains in the capsule is observed by the use of an X-ray facility.

References Cited

UNITED STATES PATENTS

| | | | |
|---|---|---|---|
| 1,711,347 | 4/1929 | Harter | 73—88 |
| 2,599,578 | 6/1952 | Obert et al. | 73—88.5 |
| 3,205,464 | 9/1965 | Schwartz | 73—88.5 X |

DAVID SCHONBERG, *Primary Examiner.*

S. CLEMENT SWISHER, *Assistant Examiner.*